United States Patent [19]

Crawford

[11] 4,218,074
[45] Aug. 19, 1980

[54] MOTOR VEHICLE FOLDING SEAT AND SEAT OCCUPANT RESTRAINT ARRANGEMENT

[75] Inventor: Ray V. Crawford, Warren, Mich.

[73] Assignee: General Motors Corporation, Detroit, Mich.

[21] Appl. No.: 950,732

[22] Filed: Oct. 12, 1978

[51] Int. Cl.² .............................................. B60R 21/10
[52] U.S. Cl. ...................... 280/801; 297/474
[58] Field of Search ............... 280/744, 746, 747; 297/385, 388; 296/65 R

[56] References Cited

U.S. PATENT DOCUMENTS

| 1,957,004 | 5/1934 | Smith | 155/5 |
|---|---|---|---|
| 2,797,732 | 7/1957 | Thomas | 155/13 |
| 3,116,092 | 12/1963 | Spranger | 297/388 |
| 3,214,218 | 10/1965 | Gill | 297/388 |
| 3,248,148 | 4/1966 | Board et al. | 297/388 |
| 3,333,885 | 8/1967 | Franke et al. | 296/66 |
| 3,667,806 | 6/1972 | Sprecher | 297/388 |
| 3,749,418 | 7/1973 | Fancy | 297/388 |

FOREIGN PATENT DOCUMENTS 273896 12/1964 Australia .................................. 297/388

Primary Examiner—John J. Love
Assistant Examiner—D. W. Underwood
Attorney, Agent, or Firm—R. L. Phillips

[57] ABSTRACT

A motor vehicle folding seat and seat occupant restraint arrangement comprising a folding seat having a seat back hinged to a seat bottom which in turn is hinged to the vehicle floor whereby the seat is foldable in an upright position to provide increased storage area and wherein the seat occupant restraint includes a load-carrying member of relatively short length which is secured to the underneath side of the seat bottom and is releasably securable to the vehicle floor to both maintain the seat in its normal position and also transmit loads for seat belt restraint systems which are either anchored at both ends to the load-carrying member or are anchored at one end to the load-carrying member and at the other end directly to the vehicle floor whereby the seat bottom frame is not subjected to any force resulting from loads applied by an occupant to any of the restraint systems and whereby the floor is left unobstructed when the seat is folded in its stored position.

3 Claims, 3 Drawing Figures

MOTOR VEHICLE FOLDING SEAT AND SEAT OCCUPANT RESTRAINT ARRANGEMENT

This invention relates to a motor vehicle folding seat and seat occupant restraint arrangement and more particularly to such an arrangement wherein the seat together with a portion of the restraint system is releasably secured to the vehicle floor.

In utility type motor vehicles having a seat which may be folded when not in use to provide more storage area, it is desirable that any seat occupant restraint system associated therewith also be storable along with seat to leave the floor area free of obstruction. This can be accomplished, of course, by simply anchoring the entire seat occupant restraint system(s) to the seat frame but this requires strengthening of the seat frame which adds substantially to its weight.

The folding seat and seat occupant restraint arrangement according to the present invention leaves the floor area substantially unobstructed in its folded condition yet adds substantially less weight to the seat frame than prior known arrangements. This is accomplished with an existing seat frame without strengthening modifications thereto by simply fixing to one rail thereof a short, light-weight, rigid, load-carrying member which is releasably anchorable at its opposite ends to the vehicle floor substantially inboard of the seat ends. One or more outboard seat occupant restraint systems are permanently anchored at one end to the load-carrying member and at the other end directly to the vehicle floor and thus the seat frame is not subjected to any of the occupant restraint loads. Then when the load-carrying member if released from the vehicle floor to permit the seat to be folded away in its storage position, those anchor ends of the vehicle restraint secured thereto move along therewith thereby leaving the vehicle floor space vacated by the seats unobstructed. In the case where three restraint systems are desired for the seat, both ends of the intermediate restraint system are anchored to the load-carrying member which in this case would then transmit all the restrained load of a mid seat occupant to the vehicle floor in addition to providing for storage of this restraint along with the seat to clear the vehicle floor of any obstruction in the unoccupied space.

An object of the present invention is to provide a new and improved motor vehicle folding seat and seat occupant restraint arrangement.

Another object is to provide in a motor vehicle, a folding seat and seat occupant restraint arrangement wherein a short, light-weight, rigid, load-carrying member is fixed to the seat frame and serves to provide for securing both the seat and the occupant restraint to the vehicle floor intermediate the ends of the seat whereby the seat frame is not subjected to any force resulting from loads applied by an occupant to the restraint and the vehicle floor is left unobstructed when the seat is folded in a stored position.

Another object is to provide in a motor vehicle, a folding seat and seat occupant restraint arrangement wherein a short, light-weight, rigid, load-carrying member is fixed to the rear rail of the seat frame and is releasably anchorable to the vehicle floor and has anchored thereto one end of an outboard seat occupant restraint whose other end is directly anchored to the vehicle floor at one end of the seat whereby the seat frame is not subjected to any force resulting from loads applied by an occupant to the restraint and the vehicle floor is left unobstructed when the seat is folded in a stored position.

Another object is to provide in a motor vehicle, a folding seat and seat occupant restraint arrangement wherein the seat is hinged at its front to the vehicle floor and wherein a short, load-carrying bar is fixed along the rear of the seat and is releasably secured at its opposite ends to the vehicle floor to releasably secure the seat in its upright position and wherein a seat occupant restraint is anchored at one end to the bar and at the other end to the vehicle floor at one end of the seat whereby the seat is not subjected to any force resulting from loads applied by an occupant to the restraint and the anchored inboard end of the restraint moves together with the seat to its folded storage position on unlatching of the bar from the floor so that the floor space left clear by the seat for added storage is not obstructed by any portion of the restraint.

These and other objects of the present invention will be more apparent from the following description and drawings in which.

Figure 1:
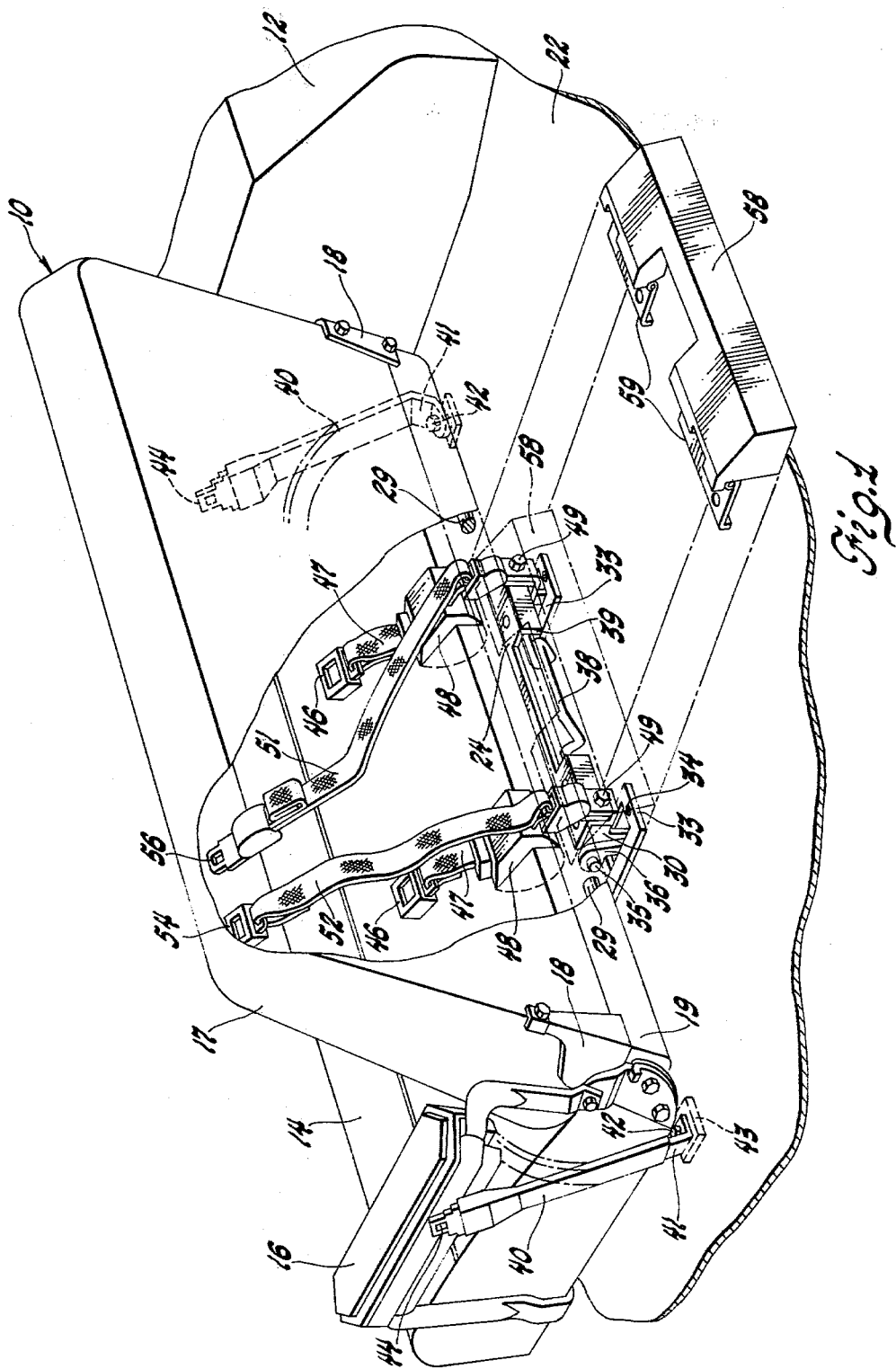
FIG. 1 is a partial three-dimensional view of the interior of a motor vehicle with a folding rear seat and seat occupant restraint arrangement according to the present invention wherein the seat is shown in its seating position.
Figure 2:
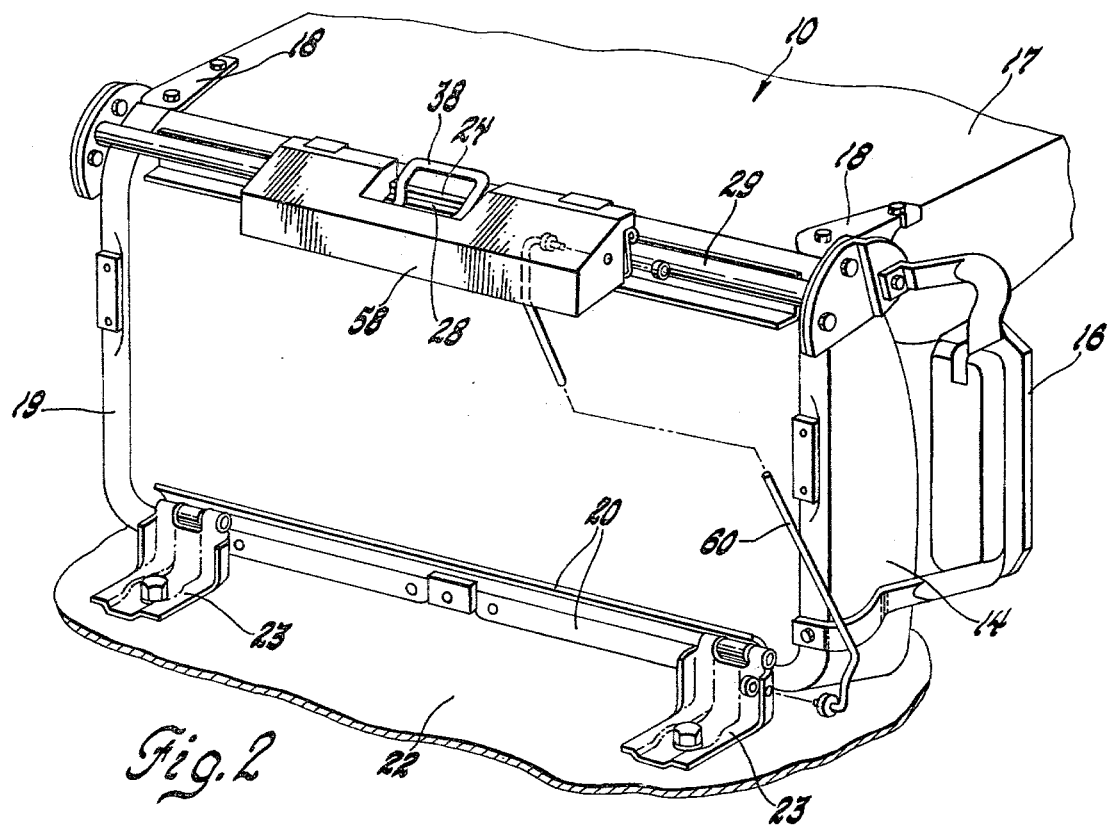
FIG. 2 is a three-dimensional view of the folding rear seat and seat occupant restraint arrangement in FIG. 1 in its stored position.

Referring to FIGS. 1 and 2, the invention is disclosed in use with a folding rear seat assembly 10 in the rear of a motor vehicle body 12 of the utility type wherein the seat is capable of supporting three occupants and is foldable in such a manner as to provide added storage space when the seat is not being occupied. The seat assembly 10 extends transversely of the vehicle behind a front seat not shown and comprises a seat bottom 14 with arm rests 16 and a seat back 17 whose frame is pivotally secured at the bottom thereof by a pair of hinges 18 to the rear ends of the seat bottom frame 19. The seat bottom frame 19 is pivotally secured at its front longitudinally extending rail 20 to the vehicle floor 22 by a pair of hinges 23 whereby with the seat back folded down on the seat bottom, the thus folded seat assembly can be pivoted about the lower forward edge of the seat bottom to the upright stored position shown in FIG. 2 to provided added storage space in the rear of the vehicle when the rear seat is not being occupied.

The seat assembly is releasably retained in its normal upright position shown in FIG. 1 by a seat frame and seat-occupant-restraint, load-carrying and attaching mechanism comprising a rigid member 24 in the form of a bar which is L-shaped in cross-section and extends less than half the length of the seat bottom frame. The load-carrying member 24 is fixed along its length by self-tapping threaded fasteners 26 to a flat tapping plate 28 which is welded to a solid round bar 29 which forms the rear longitudinally extending rail of the seat bottom frame 19.

The load-carrying member 24 is centered with the seat bottom's rear frame rail 29 and has a two-prong guide 30 welded to each end thereof. The guides 30 point downwardly to engage anchor pins 31 which are located and fixed in recesses 32 formed in the vehicle floor. The recesses 32 are bordered by scuff plates 33 which are secured in place by self-tapping threaded fasteners 34. Latching of the load-carrying member 24 to the anchor pins 31 is provided by a latching bar 35 which is pivotly mounted adjacent its ends in the depending guides 30. A latch plate 36 is fixed to each end of the bar 35 where it extends past a guide and a spring 37 coiled about and secured at one end to the latching bar and at the other end engaging the load carrying member 24 urges turning of the latching bar and thus pivoting of the latch plates 36 to engage the anchor pins 31 at right angles to the guides 30 to thus latch the load-carrying member to the vehicle floor. A bend 38 is formed in the otherwise straight latching bar centrally thereof and extends through a cut-away portion 39 of the load carrying member to provide a handle that may be grasped to turn the latching bar 35 against the spring 37 to disengage the latches 36 from the pins 31.

The load-carrying member 24 thus serves to support the load of the seat assembly 10 at its rear edge and in addition also serves as a load carrier for restraining occupants of the seat as will now be described. As shown, restraint systems are provided for three occupants with the two outboard restraint systems each comprising a retractable lap belt arrangement having an unretracting belt portion 40 of fixed length with an anchor 41 which is secured by a self-tapping threaded fastener 42 to a tapping plate 43 which is welded to the underside of the vehicle floor at a location adjacent the outboard rearward end of the seat bottom. The other end of the fixed length seat belt portion 40 has a latch plate 44 which is detachably engaged by a buckle 46 that is secured to one end of the other seat belt portion 47 which passes between the seat bottom and back. The other end of the seat belt portion 47 is secured to a retracting mechanism 48 of conventional type which is anchored by a self-tapping threaded fastener 49 to the load-carrying member 24 adjacent the end thereof where the seat portion served by this belt terminates.

The restraint of the person occupying the mid-portion of the seat is provided by either a retractable seat belt arrangement as previously described or by a belt arrangement of the non-retractable type as shown which comprises a belt portion 51 of adjustable length that passes between the seat bottom and back and is anchored along with one of the retracting mechanisms 48 to the load-carrying member 24. A non-adjustable belt portion 52 which has a buckle 54 for engaging a latch plate 56 on the adjustable belt portion 51 also passes between the seat bottom and back and is similarly anchored along with the other retracting mechanism 48 to the load-carrying member 24.

Figure 3:
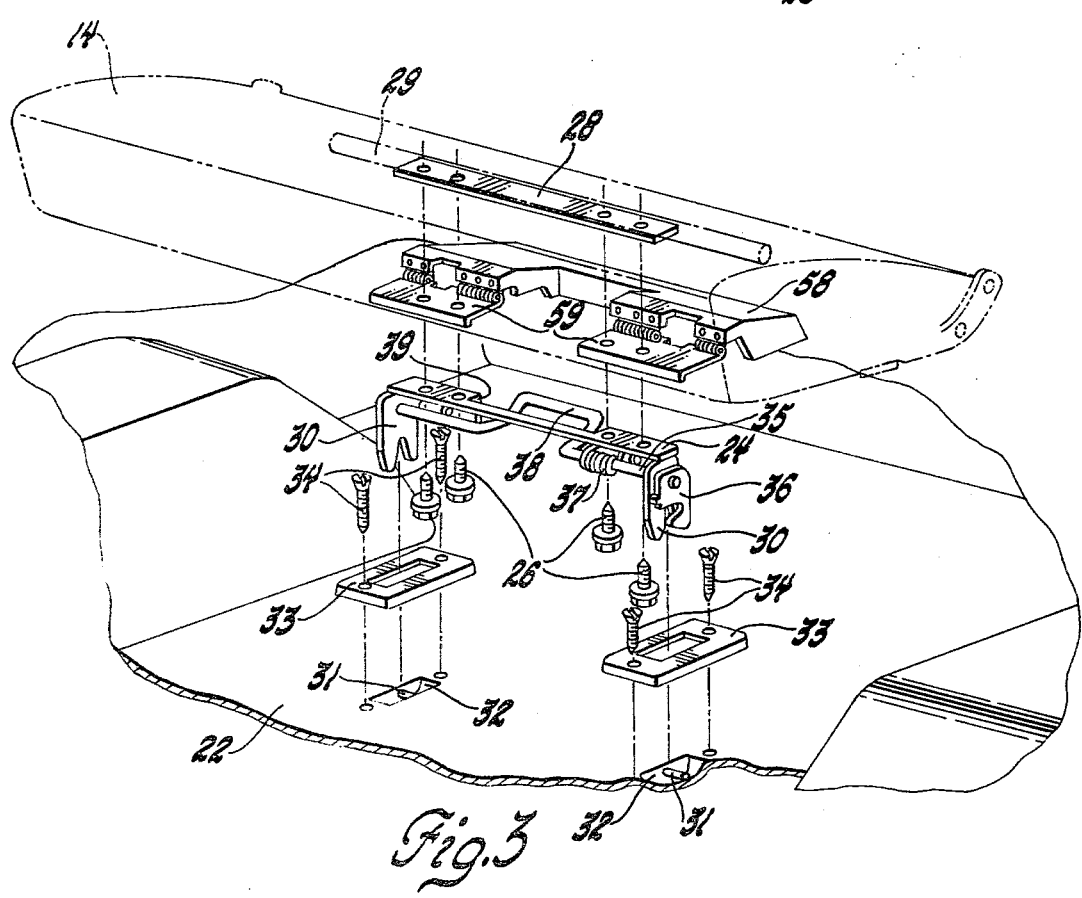
FIG. 3 is an exploded view of parts of the folding rear seat and seat occupant restraint arrangement in FIG. 1.

The latching mechanism as well as the seat belt retractors are continuously covered as shown in FIGS. 2 and 3 by a latch cover 58 having hinges 59 which are secured along with the load-carrying member 24 to the rear frame rail 29. A rod 60 is pivotly secured at one end to one end of the latch cover 58 and is pivotly secured at its other end to an upstanding flange on the floor attached hinge plate of the seat bottom front hinge 23 at this end of the cover. The pivot locations of the rod 60 are such that when the seat bottom is moved between its normal horizontal seating position and its vertical stored position the cover 58 is swung by the rod 60 to maintain a covering over the latching and seat retractor mechanisms.

Thus it will be observed that with the seat frame and also portions or all of the restraint systems therefor detachably secured to the vehicle floor through the load-carrying member 24, the load applied by a seat occupant to any one of the restraints is resisted by the vehicle floor apart from the seat frame which would otherwise normally have to be reinforced or redesigned to carry any restraint load in addition to the normal seat loading. Furthermore, by anchoring the outboard ends of the outboard occupant restraints directly to the vehicle floor rather than to the load-carrying member, this member is permitted to be made very short in comparison to the length of the seat to minimize the weight it adds to the seat. In addition, there remains no occupant restraint anchorage or obstruction in the floor area formerly exposed by the seat when folded in its stored position recognizing that while the outboard ends of the two outboard restraints remain anchored to the vehicle floor, they are close to the interior sides of the vehicle body and thus substantially out of the way of the storage area.

The above described embodiment is illustrative of the invention which may be modified within the scope of the appended claims.

The embodiments of the invention in which an exclusive property or privilege is claimed are defined as follows:

1. In combination with a vehicle body having a floor, a vehicle seat including a seat bottom having a frame with a front rail and a rear rail extending transversely of the vehicle, a seat back, hinge means pivotally connecting the seat back to the seat bottom frame for movement between a normal seating arrangement and a folded arrangement permitting seat storage, hinge means pivotally connecting said vehicle floor and said front rail to mount the seat on the vehicle for movement between a normal seating position and a generally upright stored position with the seat back folded upon the seat bottom, rigid seat and occupant restraint load-carrying means substantially shorter in length than said rear rail, said load-carrying means centrally arranged and fixed along its length to said rear rail, anchor means recessed in said vehicle floor, latch means on said load-carrying means for releasably securing said load-carrying means to said anchor means to maintain the seat in its normal seating position and releasably permitting movement to the upright storage position, and occupant restraint means having one end secured directly to the vehicle floor and another end secured directly to said load-carrying means whereby said occupant restraint means is effectively secured to the vehicle floor apart from the seat bottom frame when said load-carrying means is secured thereto so that the seat bottom frame is not subjected to any force resulting from loads applied by an occupant to the restraint means and whereby there is left no obstruction associated with the seat and the restraint means in the vehicle floor area vacated by the seat when moved to its stored position on unanchoring of the load-carrying means from the vehicle floor.

2. In combination with a vehicle body having a floor, a vehicle seat including a seat bottom having a frame with a front rail and a rear rail extending transversely of the vehicle, a seat back, hinge means pivotally connecting the seat back to the seat bottom frame for movement between a normal seating arrangement and a folded arrangement permitting seat storage, hinge means pivotally connecting the said vehicle floor and said front rail to mount the seat on the vehicle for movement between a normal seating position and a generally upright stored position with the seat back folded upon the seat bottom, rigid seat and occupant restraint load-carrying means substantially shorter in length than said rear rail, said load-carrying means centrally arranged and fixed along its length to said rear rail, a pair of anchor means recessed at spaced locations in and fixed to said vehicle floor, a pair of latch means on said load-carrying means for releasably securing said load-carrying means to said anchor means to maintain the seat in its normal seating position and releasably permitting movement to the upright storage position, and occupant restraint means having one end secured directly to the vehicle floor and another end secured directly to said load-carrying means whereby said occupant restrain means is effectively secured to the vehicle floor apart from the seat bottom frame when said load-carrying means is secured thereto so that the seat bottom frame is not subjected to any force resulting from loads applied by an occupant to the restraint means and whereby there is left no obstruction associated with the seat and the restraint means in the vehicle floor area vacated by the seat when moved to its stored position on unanchoring of the load-carrying means from the vehicle floor.

3. In combination with a vehicle body having a floor, a vehicle seat including a seat bottom having a frame with a front rail and a rear rail extending transversely of the vehicle, a seat back, hinge means pivotally connecting the seat back to the seat bottom frame for movement between a normal seating arrangement and a folded arrangement permitting seat storage, hinge means pivotally connecting said vehicle floor and said front rail to mount the seat on the vehicle for movement between a normal seating position and a generally upright stored position with the seat back folded upon the seat bottom, rigid seat and occupant restraint load-carrying means substantially shorter in length than said rear rail, said load-carrying means centrally arranged and fixed along its length to said rear rail, a pair of anchor means recessed at spaced locations in and fixed to said vehicle floor, a pair of latch means on said load-carrying means for releasably securing said load-carrying means at opposite ends thereof to said anchor means to maintain the seat in its normal seating position and releasably permitting movement to the upright storage position, a pair of outboard occupant restraint means each have one end secured directly to the vehicle floor at one end of the seat and another end secured directly to said load-carrying means, and another occupant restraint means located intermediate said outboard occupant restraint means and entirely secured directly to said load-carrying means whereby all said occupant restraint means are effectively secured to the vehicle floor apart from the seat bottom frame when the said load-carrying means is secured thereto so that the seat bottom frame is not subjected to any force resulting from loads applied by occupants to the restraint means and whereby there is left no obstruction associated with the seat and the restraint means in the vehicle floor area vacated by the seat when moved to its stored position on unanchoring of the load-carrying means from the vehicle floor.

* * * * *

UNITED STATES PATENT AND TRADEMARK OFFICE
CERTIFICATE OF CORRECTION

PATENT NO. : 4,218,074
DATED : August 19, 1980
INVENTOR(S) : Ray V. Crawford

It is certified that error appears in the above—identified patent and that said Letters Patent is hereby corrected as shown below:

In the References, "10/1965" should be -- 10/1975 --.

Column 6, line 13, "have" should be -- having --.

Signed and Sealed this

Third Day of February 1981

[SEAL]

Attest:

RENE D. TEGTMEYER

Attesting Officer     Acting Commissioner of Patents and Trademarks